Feb. 23, 1932.  P. S. SHIELD  1,846,618
VEHICLE TANK
Original Filed June 24, 1927  4 Sheets-Sheet 1

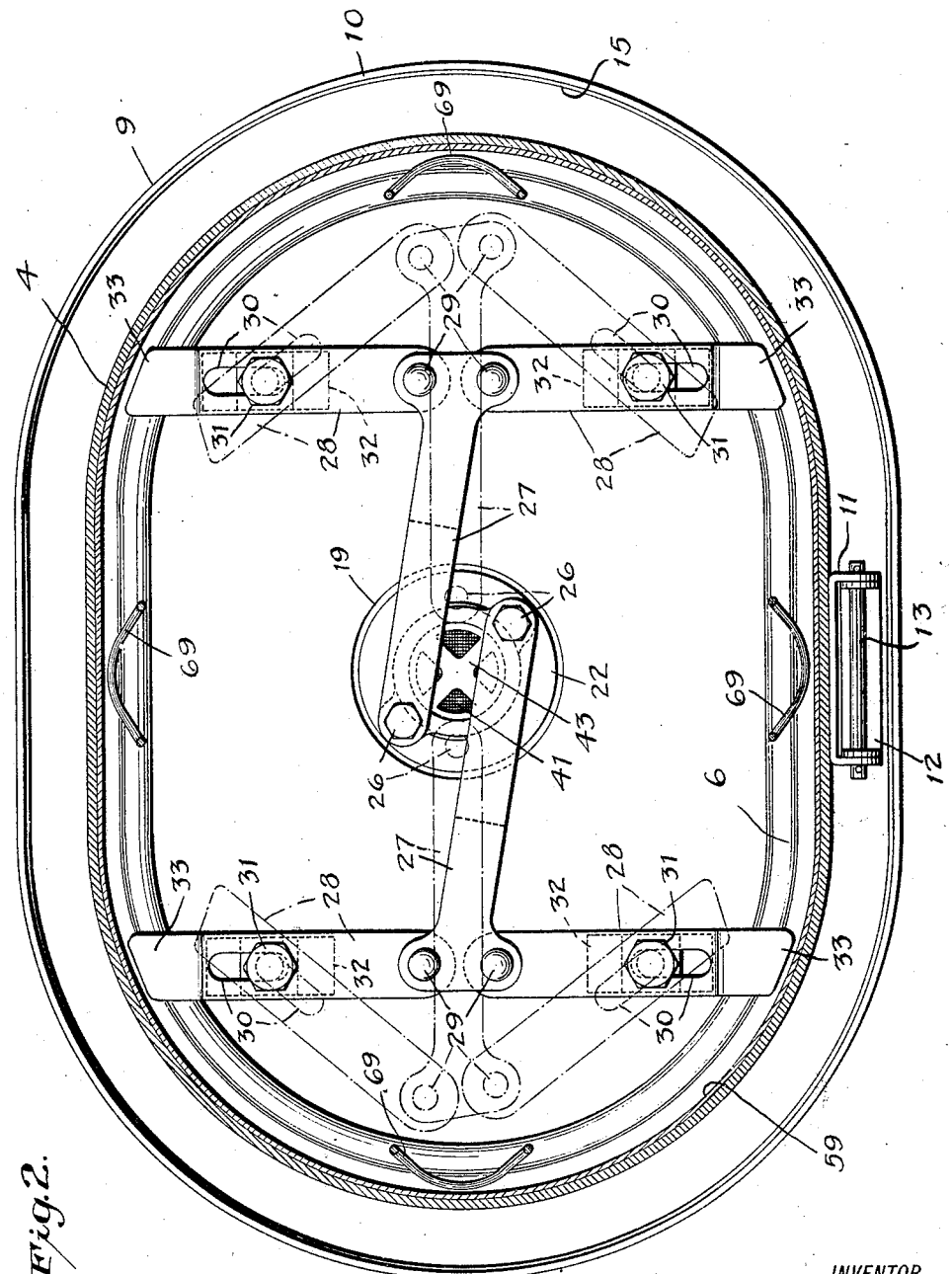

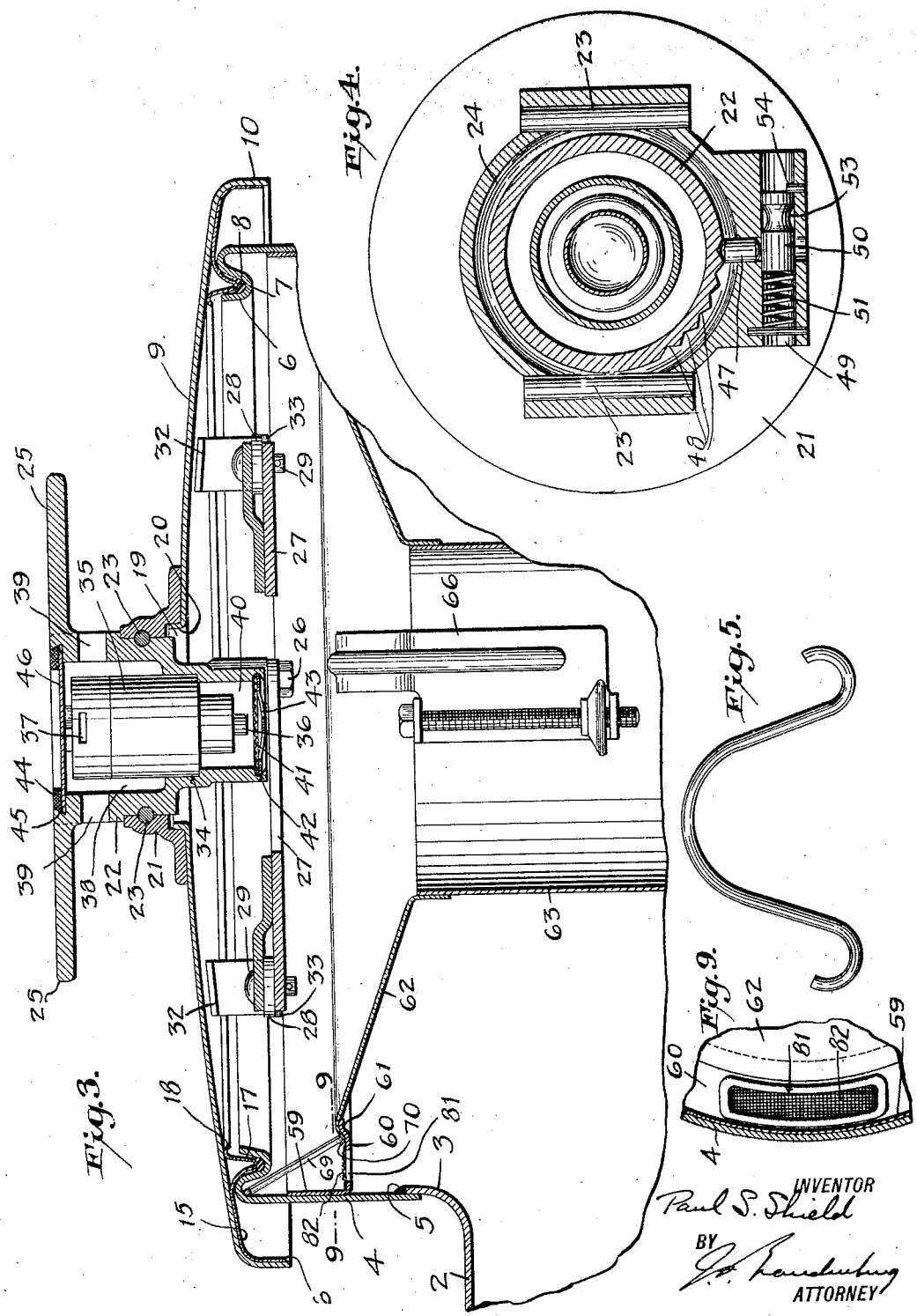

Feb. 23, 1932.   P. S. SHIELD   1,846,618
VEHICLE TANK
Original Filed June 24, 1927   4 Sheets-Sheet 4

INVENTOR
Paul S. Shield
BY
ATTORNEY

Patented Feb. 23, 1932

1,846,618

UNITED STATES PATENT OFFICE

PAUL S. SHIELD, OF CINCINNATI, OHIO, ASSIGNOR TO AUGUSTINE DAVIS, JR., OF CINCINNATI, OHIO

VEHICLE TANK

Application filed June 24, 1927, Serial No. 201,059. Renewed April 22, 1931.

The invention relates to tanks, more particularly those designed to hold or transport inflammable liquids such as gasoline, and is especially applicable to truck tanks. An object of the invention is to provide a light and strong construction, capable of economical manufacture, for the manhole or filling openings of such tanks and their covers. Further objects are to provide improved locking and venting means for the cover. Another object is to so mount the multiplex vent that it will be blown out by excessive internal pressure in event of a near-by fire, allowing free escape for the pressure. Another object is to provide an improved static eliminator in connection with the cover lock. Another object is to associate a fire-protection and antifoaming fill-tube in an advantageous manner with the opening beneath the cover. Another object is to provide removable means in the manhole for materially reducing evaporation during filling, by cutting down the effective area of the opening. Other objects and features will become apparent as the specification proceeds.

In the accompanying drawings, forming part hereof:

Fig. 2 is a horizontal section on the line 2—2 of Fig. 1 looking up;

Fig. 3 is a fragmentary vertical section taken at right angles to Fig. 1;

Fig. 4 is a horizontal section on the line 4—4 of Fig. 1;

Fig. 5 is a detail view of a spring strut or wedge;

Fig. 9 is a sectional plan view taken on the line 9—9 of Fig. 3.

Figure 1:
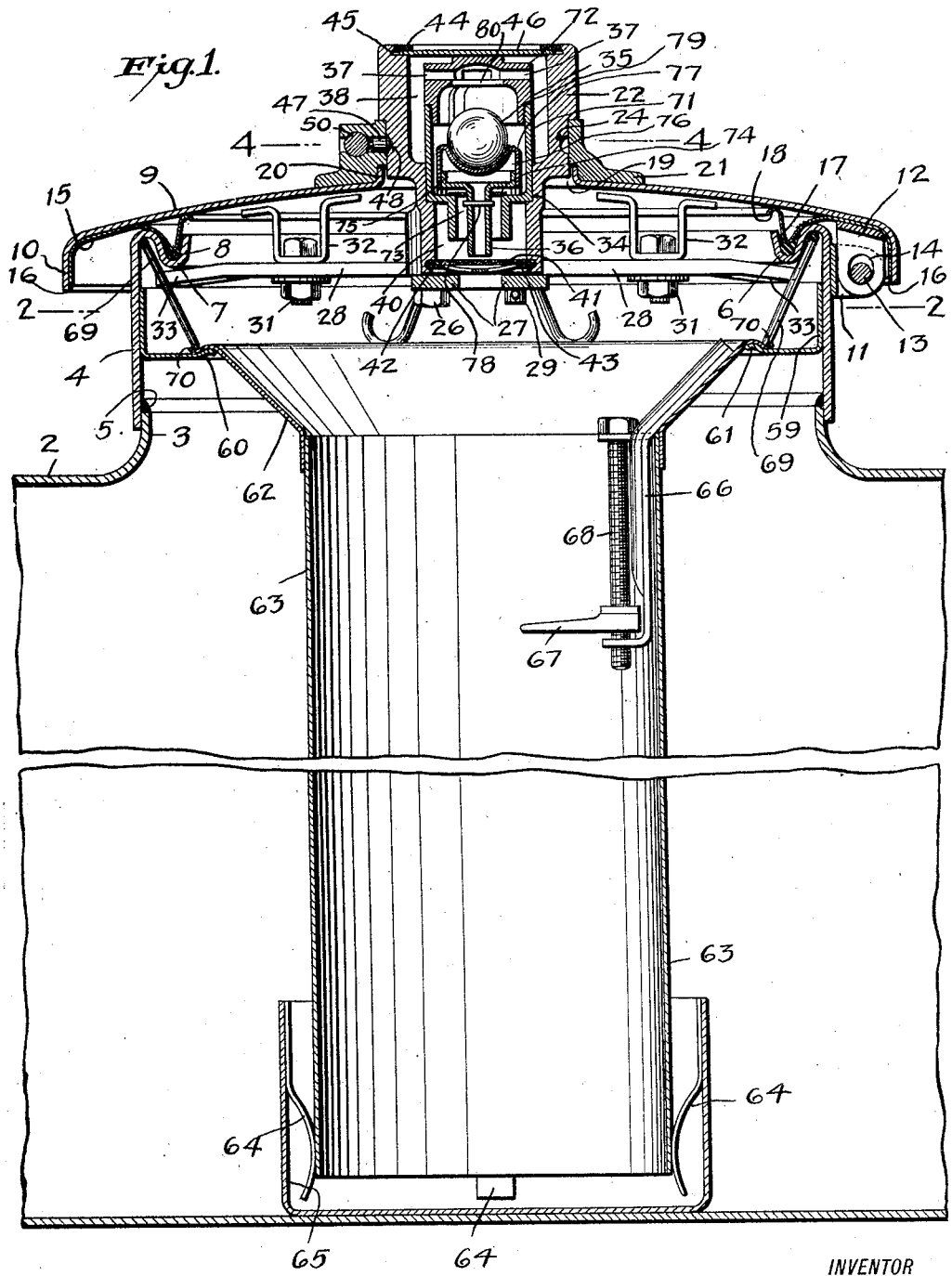
Fig. 1 is a vertical section of a portion of a tank, showing the top and bottom thereof with the intermediate region broken away, illustrating a manhole equipped with the invention.

The manhole and cover and related parts shown in Figs. 1–5, 7 and 8 will first be described.

The numeral 2 designates a portion of the truck tank. The upper wall of the shell of the tank is flanged up at 3 about a manhole opening, the opening being preferably elliptical in form. A frame 4 of sheet or plate metal is set over the flanged neck 3 and united thereto by an internal weld 5. This frame presents a vertical wall of uniform thickness surrounding the opening in the top of the tank, and its top is bent inward in a substantially horizontal, S-shaped, curved formation 6 extending continuously around the opening. The upwardly facing curve or groove 7 receives a suitable packing 8. The frame 4 and its integral internal top structure 6 are adapted for advantageous manufacture by pressed-steel construction.

A pressed-steel domed cover 9 is provided for the tank opening, this cover being mounted on the frame 4 and cooperating with the top 6. The cover is extended circumferentially beyond the vertical wall on the frame 4, outside of which it is provided with a depending flange 10 extending below the top of the frame and spaced from it. External hinge members 11, 12 on the frame 4 and on the overhanging portion of the cover 9 are connected by a pintle 13, one of the hinge members being vertically slotted, as indicated at 14, to allow of vertical play to insure tight sealing of the cover.

A ring 15, elliptical in shape in this instance, of light metal, is united to the cover and beneath the outer portion thereof, preferably by welding at the region 16 to the skirt 10 of the cover. Over the top 6 of the frame 4 this ring is bent downward in a substantially V-shaped manner, as indicated at 17, to impinge on the packing 8. The inner edge of the ring 15 forming the inner limb of the V preferably bears free against the under side of the cover, being curved over as shown at 18. A flexible elastic and self-accommodating seal is thus provided around the entire circuit of the tank opening, insuring a tight joint when the cover is closed.

The cover 9 is formed with the central opening 19 of substantial size, the internal edge of the cover 20 being flanged up around this opening. An annular steel casting 21 is welded to the central portion of the cover 9, around the opening 19. This casting forms a cylindrical bearing for a swiveled body 22 in the form of a barrel-shaped steel casting, part of which projects above the bearing 21 and part below the cover. Pins 23 in the casting 21, tangential to a groove 24 in the journal portion of the body 22, retain the said body or barrel in position against vertical displacement while permitting it to turn in the cover. The top of the swiveled body 22 is provided with laterally projecting handles 25 for turning.

Pivoted at 26 to different portions of the bottom of the swiveled body 22 are links 27, which operatively connect said swiveled member with pairs of fastening bars 28. The members of each pair of fastening bars in this particular construction are pivoted at 29 to the outer end of the corresponding link 27, and are slotted at 30 to fulcrum slidingly on bolts or pins 31 carried by brackets 32 welded to the under side of the cover 9. The outer ends 33 of the bars 28 are downwardly inclined or beveled to wedge under the downward curve of the inwardly overhanging top 6 of the frame 4. In the locking position the links 27 are retracted so as to extend the bars 28 wedgingly beneath the top of the frame. In order to release the cover, the part 22 is turned in the direction to carry the ends of the bars 28 out from engagement beneath the frame top 6, after which the cover can be swung open on its hinge.

The elliptical or oblong shape of the manhole opening and cover, which is preferably for manhole purposes, is advantageously served by two pairs of fastening bars connected by two links with the central swiveled operating member.

The hollow swiveled body or barrel 22 is formed with a bottom shouldered cylindrical bore 34 forming a seat or lateral support for a multiplex vent device 35, the plan being such that this vent is free to be expelled from its seat in event of excessive pressure within the tank.

The said vent has a downwardly projecting hollow stem 36, forming the communicating passage with the interior of the tank, and at the top has lateral openings 37 for communication with the atmosphere through the chamber 38 in the upper part of the swiveled body 22, this body having lateral openings 39 to the atmosphere.

The lower chamber 40 of the body 22, below the vent, is guarded by a fire-screen 41, which remains in place even in event of the vent 35 being expelled. This screen is seated in an undercut groove 42 in the lower end of the barrel or body 22, where it is retained by a resilient spider 43.

The vent device 35 is retained in its seat by a fusible member 44, preferably in the form of an annulus, this member being inserted beneath the overhang of a groove 45 in the top of the swiveled body 22 and retaining a plate or other member 46 which extends across the top of the vent.

The casting 21 has a radial bore guiding a sliding locking pin 47 having rounded or beveled ends, the inner end of this pin cooperating with the circumference of the swiveled body 22, which is formed with a series of notches 48 having inclined or camming sides. The bore of the locking pin 47 intersects a bore 49 in the body 22 at right angles to the pin 47, and this bore 49 contains a plunger 50 pressed in the locking direction by a spring 51. The other end of the bore 49 forms an entrance or receptacle for a cylindrical key 52, by which the locking plunger 50 can be pressed backward to a position bringing a circumferential groove or recess 53 therein opposite the locking pin 47 to permit said plunger to recede from the notches in the swiveled body 22. The recess or groove 53 is curved or beveled, as shown, so that when the spring presses the plunger to its normal position the locking pin 47 will be cammed or forced into locking engagement with the swiveled member 22, where it is held or locked by the straight side of the plunger. A pin 54 projecting inwardly from the bore 49 limits the movement of the plunger 50 under the action of the spring 51 and cooperates with the key in a manner which will be described.

The key 52 is a cylindrical rod having a suitable handle and provided in its forward portion with a longitudinal groove 56 and a lateral or circumferential groove 57. The key is inserted into the open end of the bore 49, with its longitudinal groove 56 in line with the pin 54 and pressed inward so as to force the plunger 50 back to a position which releases the locking pin 47. The key is then turned so as to carry the circumferential groove 57 into engagement with the pin 54, whereby the key is locked in position holding the plunger 50 rearward in the unlocking position. The swiveled part 22 can now be turned so as to retract the fastening bars 28, thus freeing the cover to be opened on its hinge.

The key 52 forms part of a static eliminator for the purpose of discharging any charge of static electricity that may exist in the tank before the cover can be opened. The key is therefore connected with an electrical cable or conductor 58, which is connected with ground, as indiated in Fig. 7, at the filling station. Consequently the tank closure can not be opened until a static charge has been carried off. In this connection it will be noted that the receptacle for the grounding key is entirely within the outer part of the tank and cut off from communication with the vapor space in the interior of the tank. Withdrawal of the grounding key after the cover is closed permits the spring 51 to press the plunger 50 so as to relock the pin 47 with one of the notches 48 in the swiveled barrel 22 when the barrel is turned to the locked position which projects the bars 28 under the overhang of the top of the frame 4.

An annular or elliptical frame 59 is welded to the inside of the main frame 4, this frame being preferably of angular section, its inwardly projecting lower arm forming a supporting ledge 60, the inner edge 61 of which is upwardly inclined. A funnel member 62, forming the top of a downwardly extending fire-proof fill tube 63, rests its outer edge on the ledge 60. The tube 63 is united to the funnel 62, and extends downward to a point near the bottom of the tank, where it is held by centering springs 64 in a trap or liquid-seal cup 65 secured to the bottom of the tank. A bracket 66, secured to the inside of the upper part of the fill tube, carries an adjustable capacity indicator 67 on a vertical adjusting screw 68.

The fill tube 63, with its funnel 62, is adapted for gravity filling and is removable through the manhole opening. It is retained in position by suitable devices, for example resilient wedging struts 69 formed of wire bent into U form, these struts being interposed under tension between the channeled lip 70 of the funnel 62 and the upper curve of the S-section top 6 of the main frame 4. These struts hold the fill tube firmly in position, but can be readily sprung out of place so as to permit the fill tube to be removed.

The vent 35 comprises a hollow cylindrical case 71 having its top part 72 screwed into its cylindrical upstanding wall. The bottom of the vent body is formed with an opening 73, through which the hollow stem 36 passes downward into the vapor space of the tank. This opening 73 is normally closed by a pressure relief valve disk 74, adapted to be raised by positive pressure in the tank, the vapors then finding their way through the interior of the vent casing and through the openings 37 to the atmosphere. The stem 36 is united with a piston 75 operating in a cylinder chamber 76, formed by a sheet metal member 77 secured in the vent body. Negative pressure or partial vacuum which occurs when liquid is drawn from the tank is communicated through the hollow stem to the interior of this chamber, thus causing the piston 75 to rise, and a pin or shoulder 78 on the stem lifts the valve disk 74 so as to permit external atmospheric pressure to enter the tank. The top of the chamber member 76 is formed with a spherical depression, which may be hemispherical in extent, but is preferably less, and in this depression there rests and fits a ball 79 of similar curvature. This ball is a light valve member, preferably made hollow of thin metal, though in some places a solid ball of aluminum or other metal may be employed. It is spaced a definite distance below a circular seat opening 80 in the top of the vent body and is unaffected by vapor pressure escaping from the vent. In event, however, of the tank tipping unduly or overturning, the ball rolls out of its partial spherical socket and is carried by the wash of the liquid against the seat 80, so as to completely close the seat opening and shut off outflow of liquid. This insures a very effective "triplex" vent function, by "triplex" being meant that the vent is designed not only to relieve positive pressure and compensate for minus pressure in the tank, but also to prevent or cut off outflow through the vent in case of overturning.

Figure 6:
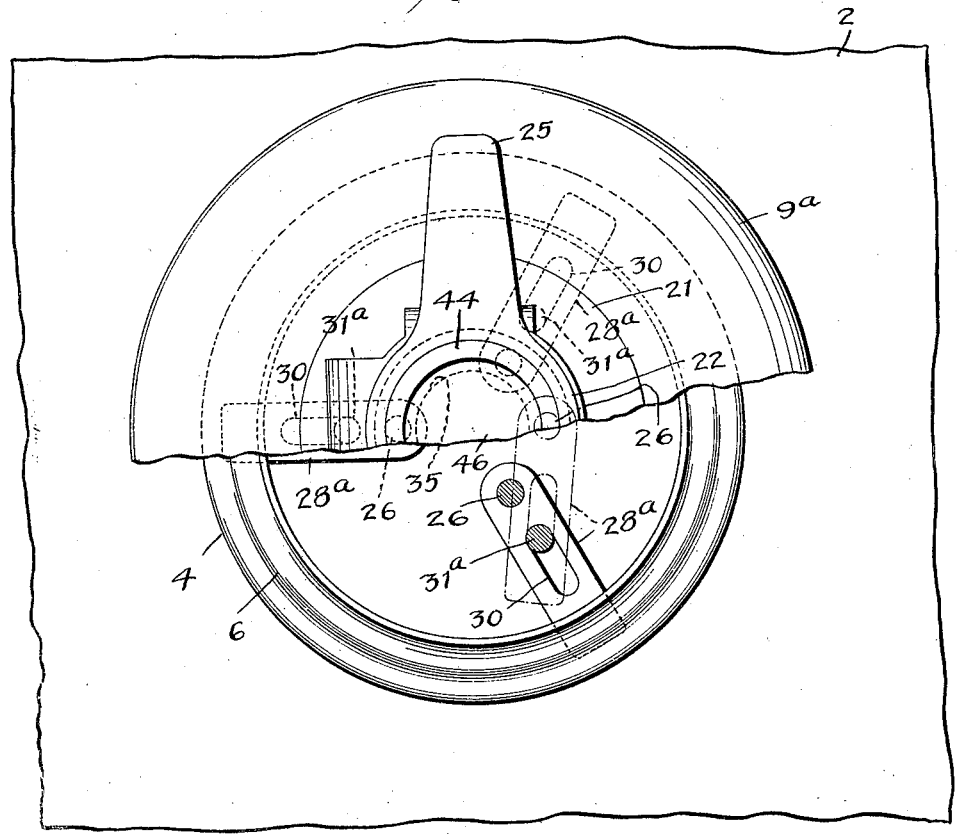
Fig. 6 is a plan view, partly broken away, of an embodiment of the invention for a fill opening, smaller than a manhole opening, two positions of one of the fastening bars being shown in full and broken lines respectively.
Figure 7:
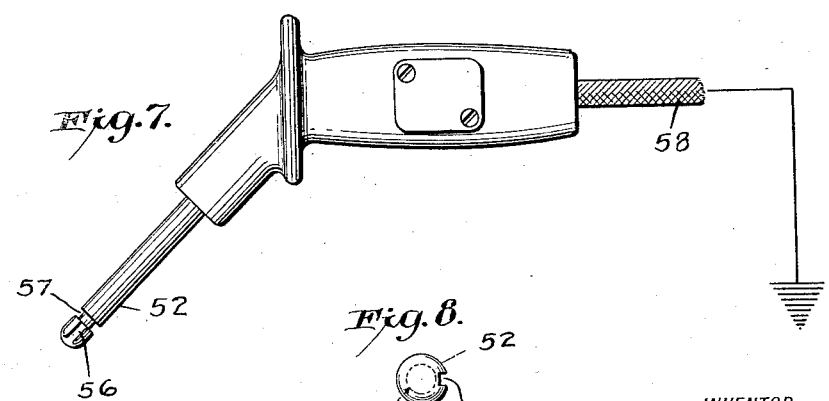
Fig. 7 is an elevation of an electrically grounded unlocking key, the ground connection being indicated schematically.
Figure 8:
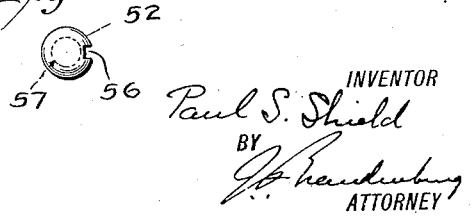
Fig. 8 is an end view of said key.

The construction shown in Fig. 6 is similar to the one already described and is applicable more particularly to small fill openings. Similar parts are marked with similar reference numerals. The chief difference is that the swiveled body 22 has three or other plural number of fastening bars 28ª directly pivoted to it, these bars being slidably fulcrumed on bolts 31ª on the under side of the cover 9ª. Turning of the swiveled member 22 in one direction projects these fastening bars substantially radially into locking position, while turning in the opposite direction retracts them to unlocking position.

The tube 63 is a fire-protection feature, and likewise substantially prevents foaming in the filling operation, since the gasoline is obliged to go to the bottom of the tube instead of churning up the whole body of the liquid.

The funnel 62 connects the tube in a removable manner with the frame. If the tube should not be desired the funnel nevertheless has an important function in that it greatly reduces the effective diameter of the manhole for filling, thereby holding down evaporation very materially.

It will be understood that there may be numerous changes in form, proportions, arrangements and details without departing from the invention.

I claim:

1. In a tank having an opening in its wall, a sheet-metal frame united to the wall of the tank around said opening, said frame comprising a vertical wall having an integral upper portion bent into a horizontal approximately S-shape section, a packing in one portion of said section, and a cover having a continuous projection on its under side to compress said packing.

2. In a tank having an opening in its wall, a sheet-metal frame united to the wall of the tank around said opening, said frame comprising a vertical wall having an integral inwardly disposed top of approximate S-section, a packing in the inner portion of said top, and a cover having a continuous projection on its under side to compress said packing, the cover being extended outwardly beyond the frame and having a downturned peripheral flange.

3. In a tank having an opening in its wall, a frame surrounding said opening and having a top provided with a groove, a cover, and a sheet metal ring under the outer portion of the cover and united thereto, said ring having a V section to impinge on a packing in said groove.

4. In a tank having an opening in its top wall, a frame united to the wall around said opening, a removable cover for said frame, a funnel member supported in said frame, and a solid-walled tube extending from said funnel member downward to the lower part of the tank.

5. In a tank having an opening in its top wall, a frame united to the wall around said opening, a cover for said frame, an inwardly projecting supporting frame united to the inside of the aforesaid frame, a funnel member supported removably by said supporting frame, and a tube extending from said funnel member downward to the lower part of the tank.

6. In a tank having an opening in its top provided with a removable cover, a vertical tube extending from said opening downward to the lower part of the tank, a bracket on the inside of said vertical tube, and a capacity indicator carried by said bracket.

7. In a tank having an opening in its top, a frame surrounding said opening, a cover for said frame, a ledge on the inside of said frame, a removable tube extending downward to the lower part of the tank, an outwardly extending part at the top of said tube resting on said ledge, and releasable members for retaining said part against said ledge.

8. In a tank having an opening in its top, a frame surrounding said opening, a cover for said frame provided with a vent, a solid-walled tube disposed centrally with respect to said frame and extending downward to the lower part of the tank, means providing a wall extending laterally from the upper end of said tube to said frame, and means in said laterally extending wall permitting the passage of vapor from the general interior of the tank around the tube into the space between said wall and the cover but preventing the transmission of flame in the reverse direction.

9. In a tank, a frame surrounding an opening in the top of the tank, a cover for said frame provided with an opening, a body swiveled in said opening and carrying multiplex vent means, and fastening means on the under side of said cover operatively connected with said body to coact with said frame.

10. In a tank, a frame surrounding an opening in the top of the tank, a cover for said frame provided with an opening, a barrel swiveled in said opening, a multiplex vent mounted in said barrel so as to be expelled therefrom by excessive internal pressure, and fastening means on the under side of said cover operatively connected with said body to coact with said frame.

11. In a tank, a frame surrounding an opening in the top of the tank, a cover for said frame provided with an opening, a barrel swiveled in said opening, a multiplex vent mounted in said barrel so as to be expelled therefrom by excessive internal pressure, a fire-screen secured to said barrel so as to remain when the vent is expelled, and fastening means on the under side of said cover operatively connected with said body to coact with said frame.

12. In a tank, a vent device, a holder in which said vent device is so mounted as to be expelled by excessive internal pressure, and external fusible means for retaining said vent.

13. In a tank having a top opening, a frame around said opening having an inwardly overhanging top, a pressed-steel cover cooperating with said top, said cover formed with an opening, an annular member secured to said cover around the opening therein, a part swiveled in said member, and fastening bars on the under side of said cover operatively connected with said swiveled part and adapted to wedge under said inwardly overhanging top.

14. In a tank having an opening in its top wall, a frame united to the wall around said opening, a removable cover for said frame, and a broad funnel member removably supported in said frame.

15. In a tank having an opening in its top wall, a frame united to the wall around said opening, a removable cover for said frame, an inwardly projecting supporting frame united to the inside of the aforesaid frame, a funnel member supported removably by said supporting frame, and means for securing said funnel to said supporting frame.

16. In a tank having an opening in its top wall, a frame surrounding said opening, a cover for said frame movable to cover and uncover said opening, and a broad solid-walled tube extending to the lower part of the tank, said tube being open at its upper end for gravity filling of the tank when said cover is opened and being joined with said frame so as to provide a fire protection walling between the general interior of the tank and the tank opening which is closed by said cover.

17. In a tank having an opening in its top wall, a frame surrounding said opening, a cover for said frame movable to cover and uncover said opening, a broad solid-walled tube extending to the lower part of the tank, said tube being open at its upper end for gravity filling of the tank when said cover is opened and being joined with said frame so as to provide a fire protection walling between the general interior of the tank and the tank opening which is closed by said cover, and means permitting the escape of vapors from the general interior of the tank through the upper portion of said walling and thence through said opening when the latter is uncovered while preventing the transmission of flame in the reverse direction.

18. In a tank having an opening in its top, a frame surrounding said opening, a cover for said frame, a ledge on the inside of said frame, means in said ledge permitting escape of vapor from the general interior of the tank through said opening when said cover is open but preventing the transmission of vapor in the reverse direction, a removable tube extending downward to the lower part of the tank and having a funnel part resting on said ledge, and means for securing said tube in place.

19. In a tank having a top opening, a cover for said opening, automatic valved venting means, a part swiveled in said cover and serving as a holder for said venting means, cover-fastening means operatively connected with said part, and an automatic locking device cooperating with said part so as to keep the same from turning in a direction to release said cover-fastening means.

20. In a tank having a top opening, a frame around said opening, a cover for said frame, a part swiveled on a vertical axis in said cover, fastening bars on the under side of said cover to engage portions of said frame, said bars being operatively connected with said swiveled part so as to be actuated by the turning of said part, and an automatic locking device on said cover cooperative with said swiveled part at any one of a number of positions thereon.

21. In a tank having a top opening, the combination with a solid-walled frame surrounding said opening and provided adjacent the top with an internal formation, of a cover to close upon said frame, a plurality of fastening elements movably connected with the under side of said cover and adapted to be projected into wedging engagement beneath said internal formation of the frame at different points so as to draw the cover tightly to the frame, said cover having an opening, a movable part filling said opening and having a handle above the cover, and pivotal connections beneath the cover between the said part and said fastening elements.

22. In a tank having a top opening, the combination with a solid-walled frame surrounding said opening and provided adjacent the top with an internal formation, of a cover to close upon said frame, a plurality of fastening elements movably connected with the under side of said cover and adapted to be projected into wedging engagement beneath said internal formation of the frame at different points so as to draw the cover tightly to the frame, said cover having an opening, parts rotatably mounted in said opening, a handle fixed to the upper portion of said rotatable part, and pivotal links beneath the cover connecting said fastening elements with said rotatable part for projecting and retracting said elements.

23. In a tank having a top opening, the combination with a solid-walled frame surrounding said opening and provided adjacent the top with an internal formation, of a cover to close upon said frame, a plurality of fastening bars carried at the under side of the cover and adapted to be projected into engagement beneath said internal formation of the frame at different points, pins connecting said fastening bars to the cover in such manner that the bars can be projected and retracted by endwise and swinging movements, said cover having an opening, a part mounted rotatably in said opening and affording a handle above the cover, and links pivoted at their opposite ends to said rotatable part and to said fastening bars.

24. In a tank having a top opening, the combination with a solid-walled frame surrounding said opening and provided adjacent the top with an internal formation, of a cover to close upon said frame, a plurality of pairs of fastening bars carried at the under side of the cover, supports for said bars enabling the bars to be projected and retracted by endwise and swinging movement, said cover having an opening, a part mounted rotatably in said opening, and a plurality of links pivoted at their inner ends to the lower portion of said part, the outer end of each of said links being pivotally connected to the adjacent ends of the two fastening bars of a pair.

25. In a tank having a top opening, the combination with a solid-walled frame surrounding said opening, of a cover to close upon said frame, said cover having an opening, a part mounted rotatably in said opening and provided with a handle, fastening elements on the under side of the cover connected with said part so that they can be projected and retracted into and out of wedging engagement with said frame, and releasable means associated with said rotatable part and providing a series of notches and a plunger to coact with said notches in such manner that the rotatable part can always be turned until the fastenings draw the cover tightly to the frame and is then held.

26. In a tank having a top opening, a frame surrounding said opening, a movable cover on said frame to cover and uncover said opening, a reducer supported in said frame below the cover, said reducer forming an inwardly extending wall for materially reducing evaporation during filling by greatly narrowing the area of opening, and a fill-tube extending from said reducer to the lower part of the tank, said fill-tube and said reducer together forming a fire protection walling between the general interior of the tank and the opening which is closed by said cover.

27. In a tank having a top opening, a frame surrounding said opening, a movable cover on said frame to cover and uncover said opening, an internal support on said frame, a reducer carried on said support, said reducer forming an inwardly extending wall for materially reducing evaporation during filling by greatly narrowing the area of opening, means securing said reducer in place and enabling the same to be removed, and a fill-tube extending from said reducer to the lower part of the tank and likewise removable through the top opening, said fill-tube and said reducer together forming a fire protection walling between the general interior of the tank and the opening which is closed by said cover.

PAUL S. SHIELD.